United States Patent [19]

Borkowski

[11] 4,102,960
[45] Jul. 25, 1978

[54] PROCESS FOR MAKING HIGH STRENGTH FLEXIBLE GRAPHITE FOIL

[75] Inventor: John W. Borkowski, Ridgway, Pa.

[73] Assignee: Stackpole Carbon Company, St. Marys, Pa.

[21] Appl. No.: 750,906

[22] Filed: Dec. 15, 1976

[51] Int. Cl.$^2$ .............................................. C04B 35/52
[52] U.S. Cl. ........................................ 264/42; 106/56; 252/378 R; 264/82; 264/105
[58] Field of Search ........................... 264/105, 42, 82; 106/56; 252/378 R

[56] References Cited

U.S. PATENT DOCUMENTS

| 3,404,061 | 10/1968 | Shane et al. | 252/378 R |
| 3,627,551 | 12/1971 | Olstowski | 106/56 |

Primary Examiner—Robert F. White
Assistant Examiner—John A. Parrish
Attorney, Agent, or Firm—Brown, Murray, Flick & Peckham

[57] ABSTRACT

Finely-divided graphite flake is heated to a high temperature in the presence of boron or a boron-containing compound to cause the boron to permeate the crystal structure of the flake, which is then subjected to an intercalating agent and rapidly heated, resulting in an expanded or vermicular graphite with a bulk density substantially less than what might be expected if the flake were not pretreated with boron. The expanded graphite then is compressed to form a preform that is reduced in thickness by rolling or molding to form a higher-strength flexible graphite foil than heretofore.

11 Claims, No Drawings

PROCESS FOR MAKING HIGH STRENGTH FLEXIBLE GRAPHITE FOIL

The way in which expanded or vermicular graphite is made is well known. Briefly, an intercalating agent, such as mixtures of nitric and sulfuric acids, or nitric acid and potassium chlorate, is introduced between the laminae of graphite flakes, which ae then rapidly heated to a high temperature, resulting in an expanded graphite with a bulk density, for example, of approximately 0.30 pounds per cubic foot. The expanded or vermicular graphite then can be compressed, and rolled or molded, to form a flexible graphite foil. A foil so produced, having a density of one gram per cubic centimeter, for example, has a tensile strength of approximately 1000 pounds per square inch, which for some applications may not be great enough.

It is an object of this invention to provide a process for making a flexible graphite foil with a much higher tensile strength than heretofore realized.

In accordance with this invention, finely-divided graphite flake, typically −10 +200 mesh but preferably fine enough to pass through a 28 mesh screen and be stopped by a 100 mesh screen, is slowly heated in the presence of boron to a temperature between 1700° C and 3000° C, preferably about 2750° C. The boron atmosphere in the furnace, in the presence of which the flake is heated, can be produced either by heating boron, or a boron-containing compound, such as boric acid; or by heating graphite flake previously wet-treated with a saturated solution of boric acid or other boron-containing compound; or by delivering to a preheated furnace containing the flake an inert carrier gas such as argon saturated with a gaseous boron-containing compound such as boron trichloride. The heating is continued for approximately one-half to two hours or until the boron has substantially completely permeated the crystal structure of the graphite flake and which usually occurs in about one hour.

The boron-treated flake then is treated in a conventional manner with an intercalating agent such as mentioned above, and rapidly heated to a temperature between about 350° C and 1100° C, preferably about 950° C, causing the graphite flake to expand. The resulting expansion is much greater than what might normally be expected if the flake had not been pretreated with boron. For example, bulk densities of material that had been intimately premixed with dry boric acid and wet-treated with a saturated solution of boric acid were 0.10 and 0.03 pounds per cubic foot, respectively. The bulk density of the expanded grahite prepared from wet-treated flake was, in fact, so low that sufficient material was difficult to accumulate for further processing.

Although the reason for the greater expansion of the boron-treated flake is not fully understood, it is believed that the boron introduced between the crystal planes of the flake reduces the bonding strength between the planes and thereby makes the graphite more susceptible to intercalation attack.

After expansion, the vermicular graphite is compressed to make a preform that is then rolled or molded to form a higher strength flexible graphite foil compared with foil made by conventional processes. The strength appears to be related to the amount of residual boron in the foil. For example, foil samples with a density of one gram per cubic centimeter and boron levels of 0.013 and 0.16 weight percent had tensile strengths of 1800 pounds per square inch and 2200 pounds per square inch, respectively. Although the reasons for the higher strengths are not fully understood, it is believed that they are the result of improved mechanical interlocking of the expanded flakes achieved by using expanded flake with a greater degree of expansion than heretofore.

According to the provisions of the patent statutes, I have explained the principle of my invention and have illustrated and described what I now consider to be its best embodiment. However, I desire to have it understood that, within the scope of the appended claims, the invention may be practiced otherwise than as specifically illustrated and described.

I claim:

1. A process for making a high strength flexible graphite foil, comprising heating finely divided graphite flake in the presence of boron to a temperature between about 1700° C and 3000° C until the boron has substantially completely permeated the crystal structure of the graphite flake, then subjecting the graphite flake to an intercalating agent and rapidly heating to a temperature between 300° C and 1100° C to expand the flake until it has a bulk density substantially lower than expanded flake not pretreated with boron, compressing the expanded graphite to make a preform, and further compressing the preform to form a flexible graphite foil.

2. A process according to claim 1, in which said graphite flake is fine enough to pass through a 28 mesh screen prior to treatment with boron.

3. A process according to claim 1, in which said first mentioned heating is in the presence of a boron-containing compound.

4. A process according to claim 3, in which said compound is boric acid.

5. A process according to claim 3, in which said heating of the graphite flake after subjecting it to an intercalating agent is to a temperature of about 950° C, and the bulk density of the expanded graphite is substantially 0.10 pounds per cubic foot.

6. A process according to claim 5, in which approximately 0.013 weight percent of said foil is boron and the tensile strength of the foil is substantially 1800 pounds per square inch.

7. A process according to claim 5, in which approximately 0.16 weight percent of said foil is boron and the tensile strength of the foil is substantially 2200 pounds per square inch.

8. A process according to claim 1, in which before said first-mentioned heating the graphite flake is wet-treated with a boron-containing solution.

9. A process according to claim 8, in which said heating of the graphite flake after subjecting it to an intercalating agent is to a temperature of about 950° C, and the bulk density of the expanded graphite is substantially 0.03 pounds per cubic foot.

10. A process according to claim 1, in which the boron is derived by saturating an inert carrier gas with a gaseous boron-containing compound and then delivering the saturated gas to a preheated furnace containing the graphite flake.

11. A process according to claim 10, in which said gaseous boron-containing compound is boron trichloride.

* * * * *